(12) United States Patent
Schirman et al.

(10) Patent No.: US 11,182,901 B2
(45) Date of Patent: Nov. 23, 2021

(54) CHANGE DETECTION IN MEDICAL IMAGES

(71) Applicant: KONINKLIJKE PHILIPS N.V., Eindhoven (NL)

(72) Inventors: Tamar Debora Schirman, Haifa (IL); Shelly Theodora Yehezkely, Haifa (IL); Yossi Kam, Haifa (IL); Georgy Shakirin, Aachen (DE); Frank Olaf Thiele, Aachen (DE); Ruth Katz, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 47 days.

(21) Appl. No.: 16/310,521

(22) PCT Filed: Jun. 29, 2017

(86) PCT No.: PCT/EP2017/066130
§ 371 (c)(1),
(2) Date: Dec. 17, 2018

(87) PCT Pub. No.: WO2018/002221
PCT Pub. Date: Jan. 4, 2018

(65) Prior Publication Data
US 2019/0188853 A1 Jun. 20, 2019

(30) Foreign Application Priority Data
Jun. 29, 2016 (EP) ..................... 16176819

(51) Int. Cl.
*G06T 7/00* (2017.01)
*G06T 7/136* (2017.01)

(52) U.S. Cl.
CPC ............ *G06T 7/0016* (2013.01); *G06T 7/136* (2017.01); *G06T 2207/20076* (2013.01); *G06T 2207/20224* (2013.01)

(58) Field of Classification Search
CPC . G06T 2207/20076; G06T 2207/20224; G06T 7/0016; G06T 7/136; G06T 7/0012;
(Continued)

(56) References Cited

U.S. PATENT DOCUMENTS 4,912,770 A * 3/1990 Seto ........................ G06T 7/254
  348/699
7,822,240 B2 * 10/2010 Ayache ................. G06T 7/0012
  382/128

(Continued)

FOREIGN PATENT DOCUMENTS

| GN | 102005049 A | 4/2011 |
| GN | 102005050 A | 4/2011 |

OTHER PUBLICATIONS

Kakadiaris, et al., "Signal-Processing Approaches to Risk Assessment in Coronary Artery Disease", IEEE Signal Processing Magazine, IEEE Service Center, Piscataway, NJ, US, vol. 23, No. 5,Nov. 1, 2006 (Nov. 1, 2006), pp. 59-62.

(Continued)

*Primary Examiner* — Siamak Harandi

(57) ABSTRACT

A difference image representing intensity differences between a first medical image and a second medical image is generated. A mixture model is fitted to an intensity distribution of the difference image to identify a plurality of probability distributions which collectively model the intensity distribution. A plurality of intensity ranges is determined as a function of the plurality of probability distributions. Image data of the difference image is labeled by determining into which of the plurality of intensity ranges said labeled (Continued)

410 image data falls. This technique more accurately details changes in medical images than known systems and methods.

20 Claims, 4 Drawing Sheets

(58) Field of Classification Search
CPC .................. G06T 7/0014; G06T 7/521; G06T 2207/10132; G06T 2207/10136; G06T 2207/30004; G06T 2207/30021; G06T 2207/30024; G06T 2207/30028; G06T 2207/30036; G06T 2207/30032; G06T 2207/30044; G06T 2207/30048; G06T 2207/30061; G06T 2207/30064; G06T 2207/30041; G06T 2207/30096; G06K 2209/057; G06K 2209/055; G06K 2209/053; G06K 2209/051; G06K 2209/05; G16B 5/20
See application file for complete search history.

(56) References Cited

U.S. PATENT DOCUMENTS

| | | | |
|---|---|---|---|
| 8,379,950 | B2 | 2/2013 | Ye et al. |
| 8,731,255 | B2* | 5/2014 | El-Baz ..................... G06T 7/33 382/128 |
| 9,186,086 | B2* | 11/2015 | Lorenz ................... A61B 5/055 |
| 10,255,526 | B2* | 4/2019 | Gandenberger ........ H04L 67/10 |
| 10,699,410 | B2* | 6/2020 | Pheiffer ................ G06T 7/0016 |
| 2003/0058237 | A1* | 3/2003 | Lee ..................... G08B 13/1968 345/418 |
| 2003/0156759 | A1* | 8/2003 | Colmenarez ............ G06T 7/143 382/228 |
| 2004/0001612 | A1* | 1/2004 | Gutta ....................... G06K 9/38 382/107 |
| 2004/0092809 | A1* | 5/2004 | DeCharms ........... A61B 5/4088 600/410 |
| 2004/0092829 | A1 | 5/2004 | Furnish |
| 2004/0241670 | A1* | 12/2004 | Ghosh ................... G06T 7/0012 435/6.11 |
| 2005/0197981 | A1* | 9/2005 | Bingham ............. G06N 3/0454 706/20 |
| 2007/0003117 | A1* | 1/2007 | Wheeler .................... G06T 7/38 382/128 |
| 2007/0030998 | A1* | 2/2007 | O'Hara .................. G06T 7/174 382/100 |
| 2007/0211958 | A1* | 9/2007 | Khazen ................. G06T 7/0016 382/274 |
| 2012/0220856 | A1* | 8/2012 | Angelini ............ G01R 33/5608 600/410 |
| 2013/0329973 | A1* | 12/2013 | Cao ....................... A61B 5/0036 382/128 |
| 2019/0057505 | A1* | 2/2019 | Pheiffer .................. G06T 7/136 |

OTHER PUBLICATIONS

Bevilacqua et al., "Retina Images Processing Using Genetic Algorithm and Maximum Likelihood Method", Proceedings Advances in Computer Science and Technology (ACST2004), Nov. 22, 2004, pp. 277-280.

Necib, et al., "Detection and characterization of the tumor change between two FDG PET scans using parametric imaging", Biomedical Imaging: From Nano To Macro, 2008. ISBI 2008. 5th IEEE International Symposium on, IEEE, Piscataway, NJ, USA, May 14, 2008, pp. 21-24.

Bruzzone, et al., "Automatic Analysis of the Difference Image for Unsupervised Change Detection", IEEE Transactions on Geoscience and Remote Sensing, IEEE Service Center, Piscataway, NJ, US, vol. 38, No. 3, May 1, 2000, pp. 1171-1182.

De Lezo, et al., "Intracoronary ultrasound assessment of directional coronary atherectomy: Immediate and follow-up findings", Journal of the American College of Cardiology, vol. 21, No. 2, Feb. 1, 1993, pp. 298-307.

Narashimha-Iyer, et al., "Robust Detection and Classification of Longitudinal Changes in Color Retinal Fundus Images for Monitoring Diabetic Retinopathy", IEEE Transactions on Biomedical Engineering, vol. 53, No. 6, Jun. 1, 2005, pp. 1084-1098.

Patriarche, et al., "A Review of the Automated Detection of Change in Serial Imaging Studies of the Brain", Journal of Digital Imaging, vol. 17, No. 3, 2004, pp. 158-174.

Patriarche, et al., "Part 2. Automated Change Detection and Characterization Applied to Serial MR of Brain Tumors may Detect Progression Earlier than Human Experts", Journal of Digital Imaging, vol. 20, No. 4, Dec. 2007, pp. 321-328.

Ayres, et al., "Estimation of the tissue composition of the tumour mass in neuroblastoma using segmented CT images", Med. Biol. Eng. Comput., 2004, 42, pp. 366-377.

Lai, et al., "Gaussian mixture modeling of histograms for contrast enhancement", Expert Systems with Applications, 39(2012) pp. 6720-6728.

Hajnal, et al., "Detection of Subtle Brain Changes Using Subvoxel Registration and Subtraction of Serial MR Images", Journal of Computer Assisted Tomography, vol. 19, No. 5, Sep./Oct. 1995, pp. 677-691.

* cited by examiner

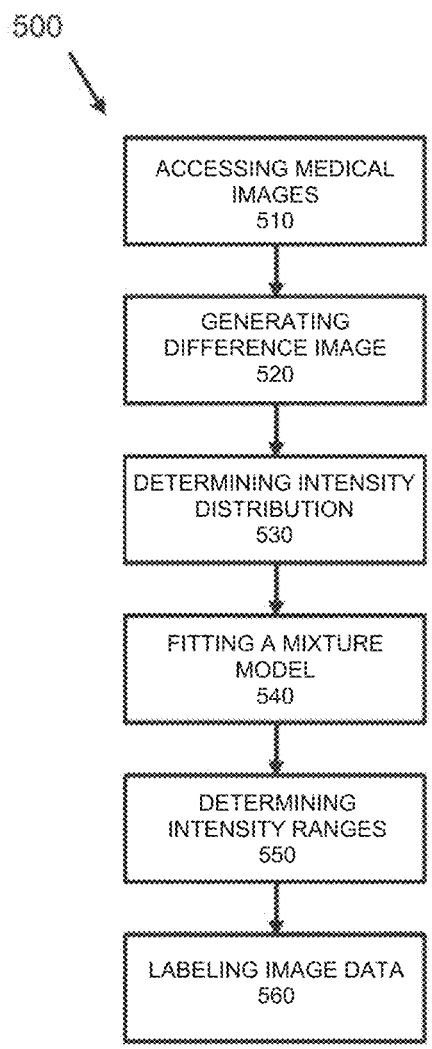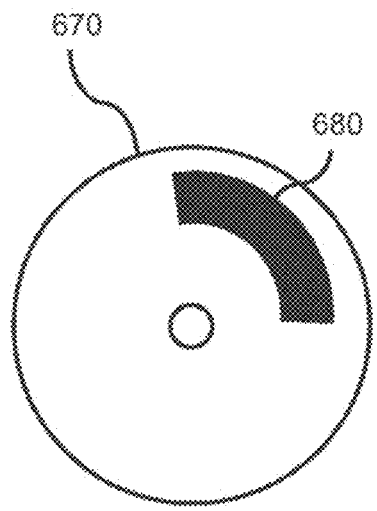
Fig. 5
Fig. 6

CHANGE DETECTION IN MEDICAL IMAGES

This application is the U.S. National Phase application under 35 U.S.C. § 371 of International Application No. PCT/EP2017/066130, filed on Jun. 29, 2017, which claims the benefit of European Application Serial No. 16176819.7, filed Jun. 29, 2016. These applications are hereby incorporated by reference herein.

FIELD OF THE INVENTION

The invention relates to a system and a method for change detection in medical images. The invention further relates to a server, imaging apparatus and workstation comprising the system. The invention further relates to a computer readable medium comprising instructions to cause a processor system to perform the method.

BACKGROUND OF THE INVENTION

Medical images may show an anatomical structure of a patient and/or functional properties of the underlying tissue. It may be desirable to detect changes in (part of) the anatomical structure of the patient, or in the functional properties of the underlying tissue. Such changes may denote a change in disease state or other type of anatomical change. For example, a change may be due to, or associated with, growth of a tumor, progression of Multiple Sclerosis (MS), etc. By detecting the change and the type of change, it may be possible to better treat the disease, e.g., by adjusting a treatment strategy. For the detection of such changes, medical images may be compared which shows the anatomical structure at different moments in time. Alternatively or additionally, the medical images may differ in other aspects, e.g., relating to a healthy and a diseased patient. A common approach for the detection of changes in the medical images is manual visual inspection, e.g., by a radiologist. However, such manual visual inspections are often time consuming and detection of delicate changes, e.g., tumor growth, edema, etc., may be difficult and inaccurate.

The article "Signal-Processing Approaches to Risk Assessment in Coronary Artery Disease" by I. Kakadiaris et al., IEEE Signal Processing Magazine, volume 23, pages 59 to 62 (2006) discloses a method for intravascular ultrasound imaging of vasa vasorum microvessels. The article "Retina images processing using genetic algorithm and maximum likelihood method" by V. Bevilacqua et al., Proceedings advances in computer science and technology, pages 277 to 280 (2004) discloses a system for retina images processing using a genetic algorithm and a maximum likelihood method. The article "Intracoronary Ultrasound Assessment of Directional Coronary Atherectomy: Immediate and Follow-Up Findings" by J. Suarez de Lezo et al., Journal of the American College of Cardiology, volume 21, pages 298 to 307 (1993) discloses a method including adjusting ultrasound gain and gray-scale settings for optimizing a visualization of desired structures. The article "Automatic Analysis of the Difference Image for Unsupervised Change Detection" by L. Bruzzone et al., IEEE Transactions on Geoscience and Remote Sensing, volume 38, pages 1171 to 1182 (2000) discloses techniques for determining whether a change has occurred or not at a pixel position of an image, wherein these techniques are based on the Bayes theory.

Moreover, US 2004/0092809 A1 discloses a computer assisted method for diagnosing a condition of a subject, wherein the condition is associated with an activation in one or more regions of interest which might be defined by discretely localized regions of, for instance, a brain, wherein the discretely localized regions may be defined physiologically through finding voxels in a three-dimensional medical image, which are modulated by a stimulus or behavior in comparison with a background condition.

A number of approaches are known in the art for automatic detection of changes in medical images. For example, Patriarche and Erickson reviewed a number of known approaches in "A review of the Automated Detection of Change in Serial Imaging Studies", Journal of Digital Imaging, Vol 17, No 3 (September), 2004, pp. 158-174.

One of the approaches which is cited by Patriarche and Erickson is the approach of Hsu et al. ("New likelihood test methods for change detection in image sequences", Computer Vision, Graphics, and Image Processing, Vol 26, 1984, pp. 73-106). The proposed approach uses the likelihood ratio to test whether a group of voxels is changing which allows smaller clusters to be detected as change as long as their magnitude is sufficiently high, as well as larger clusters to be detected as change with a smaller change requirement. It is stated that a threshold based upon cluster size is not only able to separate changes of large magnitude from noise, but also separate changes of much smaller magnitude consisting of spatially contiguous groups of voxels undergoing the same type of change.

Patriarche and Erickson further describe in "Automated Change Detection and Characterization in Serial MR Studies of Brain-Tumor Patients", Journal of Digital Imaging, 2007, 20(3), pp. 203-222, an algorithm which compares serial MRI brain examinations of brain tumor patients and judges them as either stable or progressing. It is said that the algorithm compares serial imaging studies of brain tumor patients, producing a map of change: both the nature of change (if any) and the magnitude of change for each brain voxel. As output, a color-coded change map superimposed on an anatomical image is obtained.

SUMMARY OF THE INVENTION

Disadvantageously, the known approaches to automated change detection are insufficiently accurate. It would be advantageous to have a system and method which provides more accurate change detection in medical images.

A first aspect of the invention provides a system for change detection in medical images, comprising:
  an image data interface configured to access a first medical image and a second medical image;
  a processor configured to:
  generate a difference image representing intensity differences between the first medical image and the second medical image;
  determine an intensity distribution of the difference image;
  fit a mixture model to the intensity distribution to identify a plurality of probability distributions which collectively model the intensity distribution, wherein each of the plurality of probability distributions represents a different type of change;
  determine a plurality of intensity ranges in the intensity distribution, wherein each one of the plurality of intensity ranges is determined as a function of a respective one of the plurality of probability distributions and represents the different type of change; and label image data of the difference image by determining into which of the plurality of intensity ranges said labeled image data falls.

A further aspect of the invention provides a server, workstation or imaging apparatus comprising the system.

A further aspect of the invention provides a method of change detection in medical images, comprising:

accessing a first medical image and a second medical image;

generating a difference image representing intensity differences between the first medical image and the second medical image;

determining an intensity distribution of the difference image;

fitting a mixture model to the intensity distribution to identify a plurality of probability distributions which collectively model the intensity distribution, wherein each of the plurality of probability distributions represents a different type of change;

determining a plurality of intensity ranges in the intensity distribution, wherein each one of the plurality of intensity ranges is determined as a function of a respective one of the plurality of probability distributions and represents the different type of change; and labeling image data of the difference image by determining into which of the plurality of intensity ranges said labeled image data falls.

A further aspect of the invention provides a computer readable medium comprising transitory or non-transitory data representing instructions to cause a processor system to perform the method.

The above measures provide an image data interface configured to access a first medical image and a second medical image. The medical images may be acquired by various imaging modalities. Such imaging modalities may include CT and MRI, positron emission tomography, SPECT scanning, ultrasonography, etc.

The above measures further provide a processor configured to generate a difference image representing differences between image intensity of the first medical image and the second medical image. The difference image may be obtained by, e.g., subtraction of the first medical image and the second medical image, or vice versa. Another term for difference image may be subtraction image or change image, or in case of the medical images and difference image being image volumes, subtraction volume or change volume. The difference image may also be termed a 'map', e.g., subtraction map or change map.

The processor is further configured to determine an intensity distribution of the difference image. Determining an intensity distribution of an image is known per se in the art. For example, a histogram of the intensity values of the image may be calculated.

The processor is further configured to fit a mixture model to the intensity distribution. Mixture models such as Gaussian mixture model, Multivariate Gaussian mixture model, Categorical mixture model, etc., are known per se in the art. A mixture models may be defined as a probabilistic model for representing subpopulations which are present within an overall population. By fitting a mixture model to the intensity distribution, a plurality of probability distributions may be identified which jointly model the intensity distribution. It is noted that the mixture model may represent a set of parameters, whereas said fitting of the mixture model may be provided by a set of instructions executable by the processor which estimate values for said parameters. The instructions may represent an algorithm for estimating mixture models as known per se in the art, e.g., a maximum likelihood estimation of Gaussian mixture model by expectation maximization (EM), e.g., as part of standard textbook knowledge and described in, e.g., the introductory notes "*Gaussian mixture models and the EM algorithm*" by Ramesh Sridharan, accessed on 28 Jun. 2016 at https://people.csail.mit.edu/rameshvs/content/gmm-em.pdf, of which the contents is hereby incorporated by reference with respect to the estimation of a Gaussian mixture model.

The processor is further configured to derive a plurality of intensity ranges in the intensity distribution as a function of the identified probability distributions. For example, each intensity range may be defined to represent a particular probability interval. A non-limiting example may be that if each probability distribution is a normal distribution, the intensity range may be defined as a deviation around the mean of the normal distribution. In general, an intensity range may be determined as representing an intensity range in which it is likely, or most likely, that an intensity value belongs to the subpopulation modeled by the respective probability distribution from which the intensity range was derived.

The processor is further configured to label image data of the difference image using the determined image intervals, namely by determining into which of the plurality of intensity ranges said labeled image data falls. Effectively, the pixel or voxel may be labeled to identify to which subpopulation the particular pixel or voxel is estimated to belong.

The above measures are based on the recognition that different types of changes are likely to have different intensity distributions in the difference image, and that the intensity distribution of such different types of changes may be modeled by different probability distributions. As such, the above measures involve estimating different probability distribution from the difference image. In particular, by fitting a mixture model to an intensity distribution of an observed difference image, e.g., of the entire difference image or of one or more regions of interest contained therein, a plurality of probability distributions may be identified which together model the observed intensity distribution. Mixture models and algorithms for fitting mixture models are known per se in the art of statistics. Moreover, the adjective 'collectively' may refer to the probability distributions summing, for a given intensity value, to a normalized value of 1, although this is not a limitation.

Each of the plurality of probability distributions represents a different type of change. A non-limiting example may be a first probability distribution estimated from the observed intensity distribution may represent tumor growth, a second probability distribution may represent a transition zone, and a third probability distribution may represent edema. Having estimated these different probability distributions, intensity intervals may be determined which each represent the different type of change. For example, each intensity interval may be selected as being an interval where the respective probability distribution is larger than other probability distributions, denoting that an intensity falling within the intensity range is most likely to be associated with the type of change represented by the particular probability distribution. Having determined the plurality of intensity intervals, the image data in the difference image may be labeled accordingly, in that suitable metadata may be created. It is noted that the labeling may not need to represent a biological interpretation, e.g., whether it is tumor growth, transition zone or edema, but rather merely represent different labeling, e.g., type A, type B and type C, which allows such biological interpretation to be subsequently assigned, e.g., by a radiologist or an automatic classification algorithm. Thus, it can be distinguished between different types of change if a change has been occurred, i.e. the change can be characterized. This characterization of the change can be regarded as a modelling of different classes of change within a "changed" class.

Advantageously, the above approach may allow delicate changes to be more accurately detected than change detection which is based on separately analyzing the intensities of the first and second medical image and subsequently detecting change, and the type of change, based on the outcome of such an image analysis.

Optionally, the mixture model is a Gaussian Mixture Model, and the probability distributions are Gaussian distributions. Gaussian Mixture Models (henceforth also referred to simply as GMMs) are among the most statistically mature methods for modeling probability distributions. A Gaussian mixture model may be defined as a probabilistic model that assumes all the data points are generated from a mixture of a finite number of Gaussian distributions with unknown parameters.

Optionally, the processor is configured to determine intersection points between the plurality of probability distributions, and the plurality of intensity ranges are defined based on the intersection points. Intersection points between the plurality of probability distributions represent points where the probability of one probability function matches, and may then exceed that of another probability function. Effectively, the intersection points may be used to define ranges in which it is most likely that a variable, e.g., an intensity value of a pixel or voxel, belongs to a particular subpopulation. Using these intersection points may thus advantageously help to define the intensity ranges.

Optionally, the processor is configured to, before generating the difference image, perform at least one of: an image registration, and an intensity normalization, between the first medical image and the second medical image. Advantageously, the difference image may be generated more accurately when an image registration and/or an intensity normalization between the first medical image and the second medical image is performed beforehand. A more accurate generation of the difference image may advantageously result in a more accurate detection of the changes in the medical images.

Optionally, the processor is configured to, after generating the difference image, select at least one region of interest in the difference image, and determine the intensity distribution to selectively represent the intensity distribution of said at least one region of interest. As such, the determining of the intensity distribution and subsequent steps are only performed for part(s) of the difference image. By only performing said steps for part(s) of the image, the computational complexity of the change detection may be reduced. Optionally, the processor is configured to select the at least one region of interest in the difference image on the basis of the image data of the region of interest representing a non-zero difference. The change detection may thus be focused on regions of the difference image which may actually represent changes. It is noted that the selection of the region(s) of interest may comprise using of thresholding or similar techniques to identify region(s) of interest which represent changes which are considered to be significant.

Optionally, the system further comprises a user input interface for enabling a user to indicate the at least one region of interest in the difference image. The user input interface may receive user input commands from a user input device operable by the user. In particular, the user may use the user input device, e.g., a computer mouse, keyboard or touch screen, to indicate a region of interest in the difference image. A non-limiting example is that the user may move an onscreen pointer and indicate the region of interest by clicking on the region of interest in the difference image. As such, the user is enabled to identify region(s) of interest in the difference image to which he/she wishes to apply the change detection.

Optionally, the first medical image and the second medical image are volumetric images. Optionally, the first medical image and the second medical image represent longitudinal imaging data. Longitudinal imaging data refers to imaging data which is obtained from the same patient repeatedly, e.g., during subsequent exams. As such, the medical images represent changes occurring in the particular patient, e.g., due to illness or recovery. This constitutes a particularly relevant application of the change detection.

Optionally, the processor is configured to generate an output image comprising a visualization of said labeling of the image data. Visualization of labeling in an output image may facilitate review and evaluation of the detected changes in the difference image. The output image may be output to an internal or external display for visualization. Alternatively, the labeling may be used for different, non-visual purposes, e.g., as input to a clinical decision support system, as input to an automatic classification algorithm, etc.

Optionally, the processor is configured to generate the visualization as an overlay over at least one of: the difference image, the first medical image and the second medical image. Such overlay may advantageously facilitate visualization and evaluation of the detected changes in the difference image, the first medical image and/or the second medical image. This may thus help a user to better interpret the changes.

It will be appreciated by those skilled in the art that two or more of the above-mentioned embodiments, implementations, and/or optional aspects of the invention may be combined in any way deemed useful.

Modifications and variations of the server, the workstation, the imaging apparatus, the method, and/or the computer program product, which correspond to the described modifications and variations of the system, can be carried out by a person skilled in the art on the basis of the present description.

A person skilled in the art will appreciate that the system and method may be applied to multi-dimensional image data, e.g., two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be apparent from and elucidated further with reference to the embodiments described by way of example in the following description and with reference to the accompanying drawings, in which

FIG. 5 shows a method for change detection in medical images; and

FIG. 6 shows a computer readable medium comprising instructions for causing a processor system to perform the method.

It should be noted that the figures are purely diagrammatic and not drawn to scale. In the Figures, elements which correspond to elements already described may have the same reference numerals.

LIST OF REFERENCE NUMBERS

Figure 1:
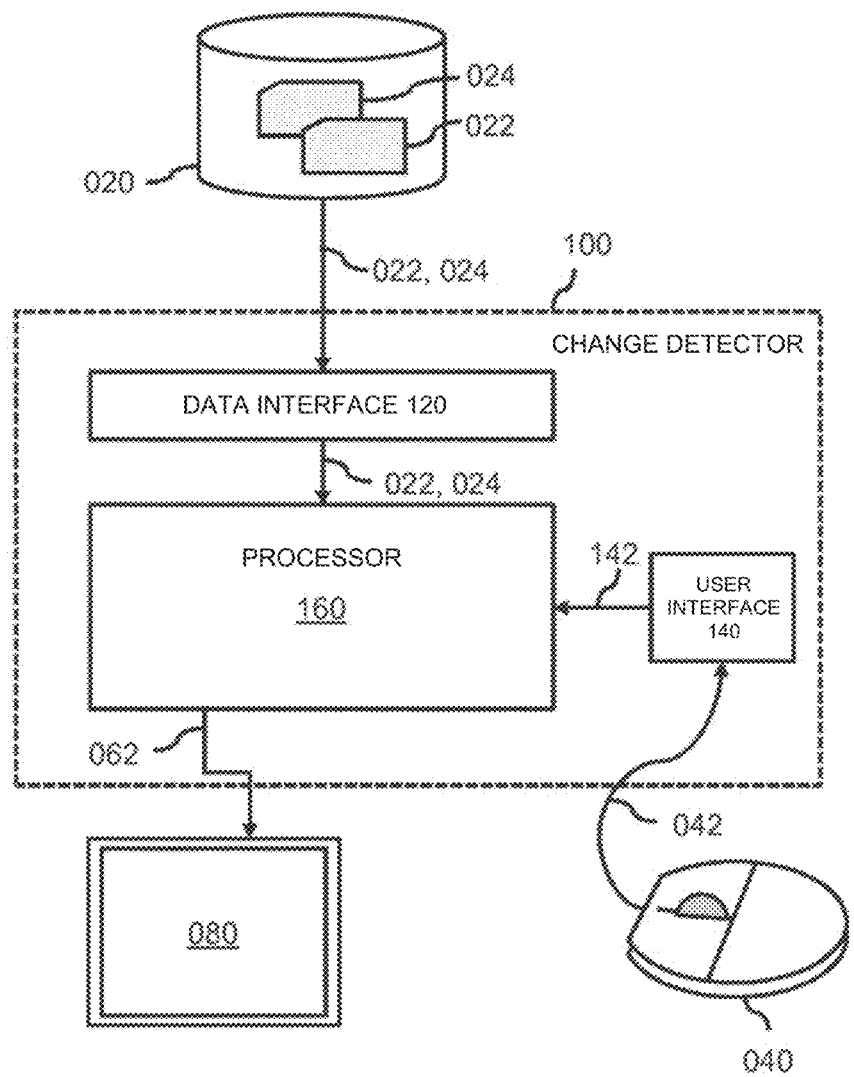
FIG. 1 shows a system for change detection in medical images.

The following list of reference numbers is provided for facilitating the interpretation of the drawings and shall not be construed as limiting the claims.

020 image repository
022 first medical image
024 second medical image
040 user input device
042 user input commands
062 display data
080 display
100 system for change detection in medical images
120 image data interface
140 user input interface
142 data communication
160 processor
200 first medical image
210 second medical image
220 difference image
300 intensity distribution of difference image
315 first component of fitted mixture model
320 second component of fitted mixture model
325 intersection point of the first and the second component
410 labeled medical image
415 labeling of image data
500 method for change detection in medical images
510 accessing medical images
520 generating difference image
530 determining intensity distribution
540 fitting mixture model
550 determining intensity ranges
560 labeling image data
670 computer readable medium
680 instructions stored as non-transient data

DETAILED DESCRIPTION OF EMBODIMENTS

FIG. 1 shows a system 100 which is configured for change detection in medical images. The system 100 comprises an image data interface 120 configured to access a first medical image and a second medical image. In the example of FIG. 1, the image data interface 120 is shown to be connected to an external image repository 020 which comprises the image data of the first medical image 022 and the second medical image 024. For example, the image repository 020 may be constituted by, or be part of, a Picture Archiving and Communication System (PACS) of a Hospital Information System (HIS) to which the system 100 may be connected or comprised in. Accordingly, the system 100 may obtain access to the image data of the first medical image 022 and the second medical image 024 via the HIS. Alternatively, the image data of the first medical image and the second medical image may be accessed from an internal data storage of the system 100. In general, the image data interface 120 may take various forms, such as a network interface to a local or wide area network, e.g., the Internet, a storage interface to an internal or external data storage, etc.

The system 100 further comprises a processor 160. The processor 160 is configured to, during operation of the system 100, receive the image data 022 from the image data interface 120, to generate a difference image representing intensity differences between the first medical image and the second medical image, and to determine an intensity distribution of the difference image. The processor 160 is further configured to fit a mixture model to the intensity distribution to identify a plurality of probability distributions which collectively model the intensity distribution, and to determine a plurality of intensity ranges in the intensity distribution, wherein each one of the plurality of intensity ranges is determined as a function of a respective one of the plurality of probability distributions. The processor 160 is further configured to label image data of the difference image by determining into which of the plurality of intensity ranges said labeled image data falls.

Figure 2A:
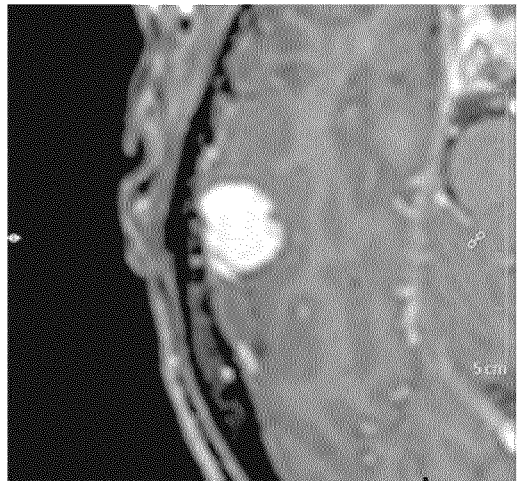
FIG. 2A shows a first medical image.
Figure 2B:
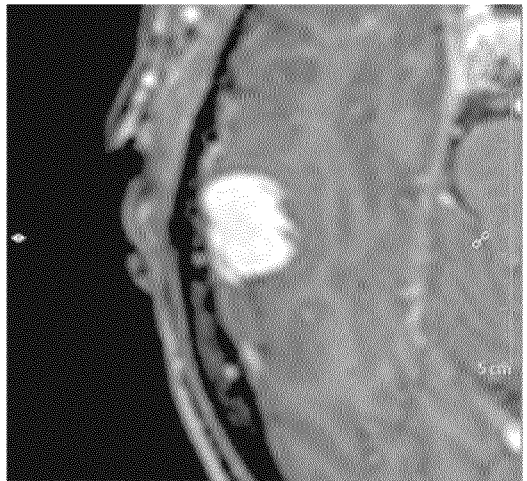
FIG. 2B shows a second medical image.
Figure 2C:
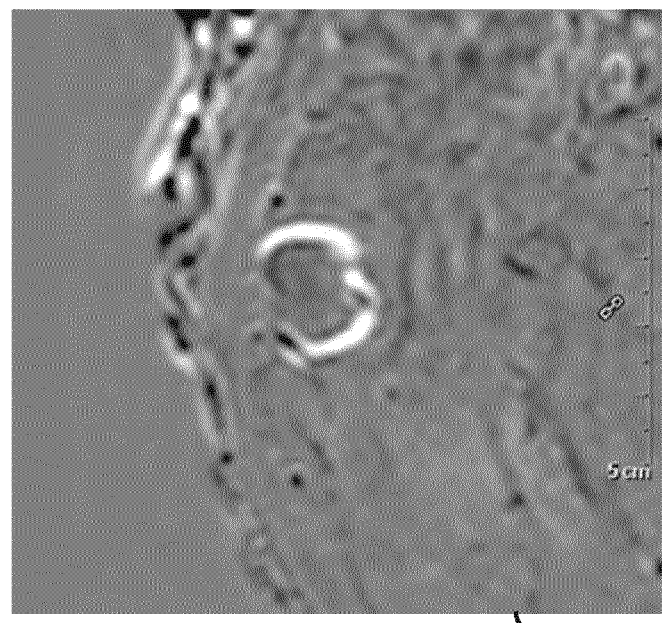
FIG. 2C shows a difference image representing intensity differences between the first medical image and the second medical image.
Figure 3:
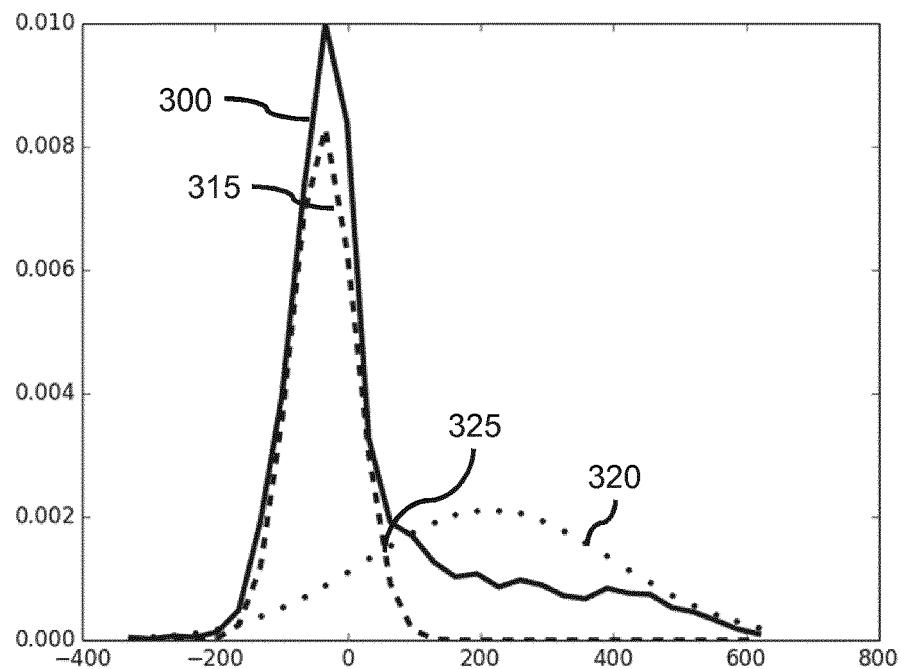
FIG. 3 shows an intensity distribution of the difference image of FIG. 2C, and mixture components of a Gaussian distribution fitted to the intensity distribution.
Figure 4:
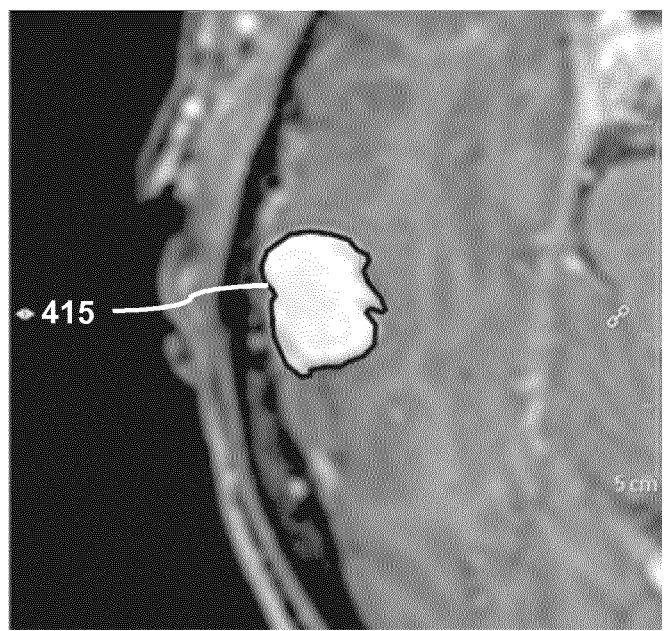
FIG. 4 shows the second medical image of FIG. 2B in which a labeling of image data by the system is shown in the form of an overlay.

These and other aspects of the operation of the system 100 will be further elucidated with reference to FIGS. 2-4.

FIG. 1 further shows an optional aspect of the system 100, in that the processor 160 may be configured to generate an output image comprising a visualization of said labeling of the image data. The output image may be output to an external display 080 in form of display data 062. Alternatively, the display may be part of the system 100. Alternatively, the display data 062 may be generated by a separate display processor (not shown), with the processor 160 providing the output image to the display processor.

FIG. 1 further shows that the system 100 may optionally comprise a user input interface 140 configured to receive user input commands 042 from a user input device 040 to enable a user to indicate a region of interest in the difference image by operating the user input device 040. This functionality will be further explained with reference to FIG. 2A-C. The user input device 040 may take various forms, including but not limited to a computer mouse, touch screen, keyboard, etc. FIG. 1 shows the user input device to be a computer mouse 040. In general, the user input interface 140 may be of a type which corresponds to the type of user input device 040, i.e., it may be a thereto corresponding user device interface.

The system 100 may be embodied as, or in, a single device or apparatus, such as a mobile device (laptop, tablet, smartphone, etc.), server, workstation or imaging apparatus. The device or apparatus may comprise one or more microprocessors which execute appropriate software. The software may have been downloaded and/or stored in a corresponding memory, e.g., a volatile memory such as RAM or a non-volatile memory such as Flash. The processor may be a computer processor, microprocessor, etc. Alternatively, the functional units of the system, e.g., the image data interface, the user input interface and the processor, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses. For example, the distribution may be in accordance with a client-server model, e.g., using a server and a thin-client PACS workstation.

FIGS. 2A-C and 3 illustrate various intermediary results of the operation of the processor 160 of the system 100 of FIG. 1. Namely, FIG. 2A shows a first medical image 200 and FIG. 2B shows a second medical image 210. Both medical images 200, 210 may represent image data of a patient, e.g., acquired at different moments in time. FIG. 2C shows a difference image 220 representing intensity differences between the first medical image and the second medical image. The difference image 220 may be obtained by, e.g., subtraction of the first medical image and the second medical image, or vice versa. FIG. 3 shows an intensity distribution 300 of the difference image 220 of FIG. 2C, and a components of a mixture model 315, 320 which is estimated by the processor to approximate the intensity distribution 300. It is noted that in FIG. 3, the horizontal axis represents the intensity difference, whereas the vertical axis represents a probability value.

Once the intensity distribution 300 has been determined by the processor, a plurality of probability distributions may be identified which jointly model the intensity distribution 300, namely by fitting a mixture model to the intensity distribution 300. The mixture model may be a mixture of a number of components with each component belonging to a same parametric family of distributions. In the example of FIG. 3, the fitted mixture model is shown to comprise a first component 315 and a second component 320 which jointly model the intensity distribution 300. It is noted that mixture models and algorithms for fitting mixture models to data distributions are known per se in the art of statistics. In the example of FIG. 3, a Gaussian mixture model may be fitted to the intensity distribution 300. However, this is not a limitation, in that other known types of mixture models may be used as well. In particular, the selection of the type of mixture model may depend on the (expected) intensity distribution of the difference image, and may be selected manually, e.g., be predetermined, for a particular clinical application.

Once the components of the fitted mixture model are determined, a plurality of intensity ranges may be defined as a function of the identified probability distributions. For example, each intensity range may be defined to represent a particular probability interval. In general, an intensity range may be determined as representing an intensity range in which it is likely, or most likely, that an intensity value belongs to the subpopulation modeled by the respective probability distribution from which the intensity range was derived. In a non-limiting example, the intensity ranges may be defined based on intersection points between the components of the fitted mixture model. In the example of FIG. 3, the intersection point 325 of the first and the second components may be determined and subsequently intensity ranges may be defined based on the intersection point 325. In this specific example, the intersection point may correspond to an intensity difference value of '50'. Accordingly, a first intensity range may be determined having '50' as upper bound and a second intensity range may be determined having '50' as lower bound.

FIG. 4 shows a labeled medical image 410 in which a labeling 415 of image data by the system 100 of FIG. 1 is shown in the form of an overlay. The labeled difference image 410 may be generated by the system 100 of FIG. 1 as an output image, e.g., for display to a clinician. The labeling may be performed by determining into which of the plurality of intensity ranges the image data of the difference image falls. Effectively, the pixel or voxel may be labeled to identify to which subpopulation the particular pixel or voxel is estimated to belong. An example of such a labeling is simply type A, type B, type C, etc., or similar neutral labeling. As such, the labels may not directly represent a biological interpretation. Nevertheless, such a biological interpretation may be explicitly or implicitly assigned to the labels, e.g., by a radiologist or an automatic classification algorithm.

It is noted that while the labeling may be determined based on the intensity distribution of the difference image, the visualization may be overlaid, or otherwise combined with, the first or second medical image instead of the difference image. FIG. 4 is an example thereof, showing the visualization overlaying the second medical image of FIG. 2B. It is noted that an image registration, and/or an intensity normalization, between the first medical image and the second medical image may be performed before generating the difference image, although this may not be needed, e.g., when both medical images are already registered or acquired in such a manner that registration is not needed. Moreover, in the example of FIGS. 2-4, the first medical image and the second medical image are shown to be 2D images. In other examples, the images may be volumetric images. The first medical image and the second medical image may further represent longitudinal imaging data, e.g., of a same patient. However, images from different patients may be also used.

It is further noted that the difference image may be generated based on the entire difference image, or specifically of one or more regions of interest of the difference image. A region of interest may be a sub-area or a sub-volume which may comprise a point of interest and surrounding image data. The region of interest in the difference image may be selected based on the image data of the region of interest representing a non-zero difference in the difference image. Additionally or alternatively, the region of interest may be selected by the user using the user input interface of the system 100 of FIG. 1. In an example, the user may use a computer mouse to indicate the region of interest in the difference image. A non-limiting example is that the user may move an onscreen pointer and indicate the region of interest by clicking on the region of interest in the difference image.

FIG. 5 shows a method 500 for change detection in medical images. It is noted that the method 500 may, but does not need to, correspond to an operation of the system 100 as described with reference to FIG. 1. The method 500 comprises, in an operation titled "ACCESSING MEDICAL IMAGES", accessing 510 a first medical image and a second medical image. The method 500 further comprises, in an operation titled "GENERATING DIFFERENCE IMAGE", generating 520 a difference image representing intensity differences between the first medical image and the second medical image. The method 500 further comprises, in an operation titled "DETERMINING INTENSITY DISTRIBUTION", determining 530 an intensity distribution of the difference image. The method 500 further comprises, in an operation titled "FITTING A MIXTURE MODEL", fitting 540 a mixture model to the intensity distribution to identify a plurality of probability distributions which collectively model the intensity distribution. The method 500 further comprises, in an operation titled "DETERMINING INTENSITY RANGES", determining 550 a plurality of intensity ranges in the intensity distribution, wherein each one of the plurality of intensity ranges is determined as a function of a respective one of the plurality of probability distributions. The method 500 further comprises, in an operation titled "LABELING IMAGE DATA", labeling 560 image data of the difference image by determining into which of the plurality of intensity ranges said labeled image data falls.

It will be appreciated that the above operation may be performed in any suitable order, e.g., consecutively, simultaneously, or a combination thereof, subject to, where applicable, a particular order being necessitated, e.g., by input/output relations.

The method 500 may be implemented on a computer as a computer implemented method, as dedicated hardware, or as a combination of both. As also illustrated in FIG. 6, instructions for the computer, e.g., executable code, may be stored on a computer readable medium 670, e.g., in the form of a series 680 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 670.

Examples, embodiments or optional features, whether indicated as non-limiting or not, are not to be understood as limiting the invention as claimed.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for change detection in medical images, comprising:
an image data interface configured to access a first medical image and a second medical image;
a processor configured to:
generate a difference image representing intensity, differences between the first medical image and the second medical image;
determine an intensity distribution of the difference image;
fit a mixture model to the intensity distribution of the difference image to identify a plurality of probability distributions which collectively model the intensity distribution, wherein each of the plurality of probability distributions represents a different type of change;
determine a plurality of intensity ranges in the intensity distribution of the difference image, wherein each one of the plurality of intensity ranges is determined as a function of a respective one of the plurality of probability distributions and represents the different type of change; and
label image data of the difference image by determining into which of the plurality of intensity ranges said labeled image data falls.

2. The system according to claim 1, wherein the medical images depict anatomy of an internal region of a patient, and the types of changes include changes in at least one of anatomic structure and functional properties of the anatomy in the internal region of the patient.

3. The system according to claim 1, wherein the processor is configured to determine intersection points between the plurality of probability distributions, and wherein the plurality of intensity ranges are defined based on the intersection points.

4. The system according to claim 1, wherein the processor is configured to, before generating the difference image, perform at least one of:
an image registration, and
an intensity normalization, between the first medical image and the second medical image.

5. The system according to claim 1, wherein the processor is configured to, after generating the difference image:
   select at least one region of interest in the difference image; and
   determine the intensity distribution to selectively represent the intensity distribution of said at least one region of interest.

6. The system according to claim 5, wherein the processor is configured to select the at least one region of interest in the difference image on the basis of the image data of the region of interest representing a non-zero difference.

7. The system according to claim 5, further comprising a user input interface for enabling a user to indicate the at least one region of interest in the difference image.

8. The system according to claim 1, wherein the first medical image and the second medical image are volumetric images.

9. The system according to claim 1, wherein the first medical image and the second medical image represent longitudinal imaging data which is obtained repeatedly over time of an internal region of a patient such that the changes are indicative of at least one of anatomical structure and functional properties changes due to at least one of illness and recovery.

10. The system according to claim 1, wherein the processor is configured to generate an output image comprising a visualization of said labeling of the image data.

11. The system according to claim 10, wherein the processor is configured to generate the visualization as an overlay over at least one of: the difference image, the first medical image and the second medical image.

12. A server, workstation or imaging apparatus comprising the system according to claim 1.

13. A method of change detection in medical images of a patient, comprising:
   accessing a first medical image and a second medical image of the patient;
   generating a difference image representing intensity differences between the first medical image and the second medical image;
   determining an intensity distribution of the difference image;
   fitting a mixture model to the intensity distribution to identify a plurality of probability distributions which collectively model the intensity distribution;
   determining a plurality of intensity ranges in the intensity distribution, wherein each one of the plurality of intensity ranges is determined as a function of a respective one of the plurality of probability distributions;
   wherein each of the plurality of probability distributions represents a different type of change in at least one of anatomical structure and functional properties of tissue of the patient;
   wherein the plurality of intensity ranges represents the different type of change in at least one of the anatomical structure and the functional properties of tissue of the patient; and
   labeling image data of at least one of: the difference image, the first medical image and the second medical image by determining into which of the plurality of intensity ranges said labeled image data falls.

14. A non-transitory computer readable medium carrying instructions configured to control a processor system to perform the method according to claim 13.

15. The method according to claim 13, further including:
   displaying at least one of the first and second medical images of the patient overlaid with labels indicating the changes in at least one of the anatomical and functional properties of the tissue of the patient.

16. A method of detecting and labeling changes in tissue of a patient in medical images of the patient, comprising:
   generating a difference image indicative of intensity differences between temporally displaced first and second images of the tissue of the patient;
   determining an intensity distribution in the difference image;
   deriving a plurality of intensity ranges in the intensity distribution of the difference image;
   fitting each of a plurality of probability distributions to one of the intensity regions in the intensity distribution of the difference image, wherein the probability distributions jointly model the intensity distribution in the difference image and wherein each of the probability distributions and corresponding intensity range represents a different type of change in the tissue of the patient;
   labeling image data in at least one of the first, second, and difference images in accordance with the type of tissue change represented by the corresponding probability distribution and intensity range.

17. The method according to claim 16, wherein at least three intensity ranges and corresponding probability distributions are derived, a first of the intensity distributions representing tumor growth, a second of the probability distributions representing a transition zone, and a third of the probability distributions representing edema.

18. The method according to claim 16, further including displaying at least one of the first and second medical images of the patient overlaid with labels indicating the type of change in the tissue of the patient.

19. The method according to claim 16, wherein each of the probability distributions is represented by a corresponding probability distribution curve and further including determining intersection points between the probability curves and wherein each of the intensity ranges is defined between adjacent intersection points.

20. A system for change detection in medical images comprising one or more processors configured to perform the method of claim 16.

* * * * *